M. S. TARKINGTON.
WHIP-SOCKET.
No. 193,568.                    Patented July 24, 1877.
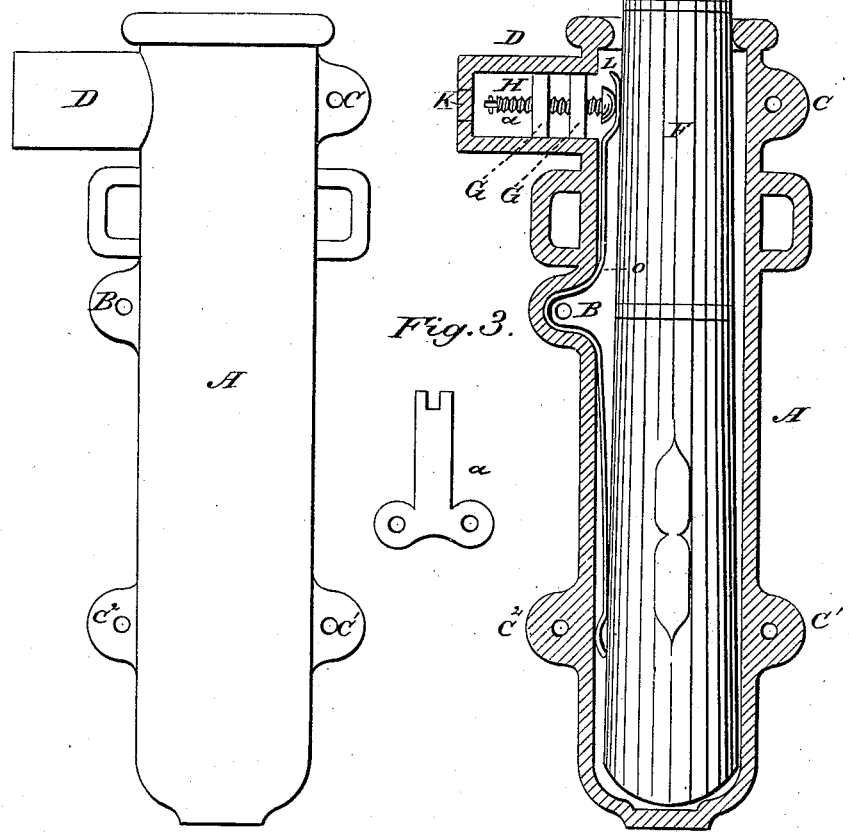
Attest
M. L. Ditmer.
August Petersohn.
Inventor:
Matthew S. Tarkington
Louis Bagger & Co.
by
Att'ys.

UNITED STATES PATENT OFFICE.

MATTHEW S. TARKINGTON, OF INDIANAPOLIS, INDIANA.

IMPROVEMENT IN WHIP-SOCKETS.

Specification forming part of Letters Patent No. 193,568, dated July 24, 1877; application filed May 16, 1876.

*To all whom it may concern:*

Be it known that I, MATTHEW S. TARKINGTON, of Indianapolis, county of Marion, State of Indiana, have invented a new and useful Whip-Socket, of which the following is a description, reference being had to the accompanying drawings.

My invention relates to sockets usually attached to a vehicle to hold whips.

It consists, first, in the construction and arrangement of the parts whereby I am enabled to place the whip in the socket and let it impinge against a spring, so as to press the whip against the opposite side of the socket from that of the spring; and, second, in the manner in which the upper end of the spring is held securely against the whip-handle by means of a screw operated by a key, in order to prevent the whip from being removed from the socket when the owner or driver is not present, thus preventing the whip from being stolen.

Figure 1 represents a side elevation of my improved whip-socket. Fig. 2 represents a sectional view of the same, showing the arrangement of parts inside and the manner in which the whip is held and prevented from being removed.

A represents the outside case, which consists of two halves, united together by means of rivets through the lugs C, C¹, C², and B. At the upper end of the case is a hollow projection, D, on the interior of which are cast two projections, G G, which are drilled and tapped so as to receive the screw H, which has a head, L, on the inside of the case A, and the other end may be made to fit any kind of a key, which operates through the hole K at the end of the projection D, to either run the screw H in or out of the case A, as shown in Fig. 2.

The lug B is formed hollow, and the spring O is held in the bend of the lug B by means of the rivet or screw that passes through the lug. Here it will be seen that the central part of the spring O is bent to fit into the lug B behind the rivet, and the upper end of the spring extends upward along the side of the whip-handle to a point just above the head of the screw H, and rests against the said screw, as shown. The lower end of the spring has a curve inward, so as to come in contact with the side of the whip-handle below the rivet in lug B, and also curves back against the case A at the extreme lower end, as shown.

By this arrangement of the spring O, when the screw H is screwed back so that the large end of the whip can freely enter the socket, the whip will descend to the bottom, and the curve of the spring will hold the whip over against the opposite side of the sock and prevent it from rattling, and in this condition the whip is always left when not necessary to leave the vehicle. But, in order to prevent the whip from being stolen or removed by any unauthorized person, the key, Fig. 3, may be inserted in the hole K of the projection D, and the screw H may be screwed up against the spring O, thus causing the spring O to engage with the whip-handle at the top of the socket, and prevent the removal of the whip until released by unscrewing the screw H.

What I claim as new, and wish to secure by Letters Patent, is—

1. A whip-socket consisting of the two halves A A, having the lug B formed hollow to receive and hold fast the spring O, and the hollow projection D, formed with one or more lugs, G G, drilled and tapped to receive the screw H, all arranged and adapted to be operated in the manner set forth and described.

2. A whip-socket consisting of two halves, A A, spring O, and screw H, in the manner set forth and described.

In testimony whereof I have signed my name to this specification in the presence of two subscribing witnesses.

MATTHEW S. TARKINGTON.

Witnesses:
 E. O. FRINK,
 E. C. WHITNEY.